Patented Oct. 5, 1954

2,690,988

UNITED STATES PATENT OFFICE 2,690,988

INSECTICIDAL SUBSTITUTED 1,3-DITHIO-LANES AND METHOD OF APPLICATION

Robert H. Jones and George E. Lukes, Irvington, and Joseph T. Bashour, New York, N. Y., assignors to Stauffer Chemical Company, a corporation of Delaware No Drawing. Application December 24, 1952, Serial No. 327,923

12 Claims. (Cl. 167—33)

This invention relates to the use of certain dithiolane compounds as insecticides.

More specifically, the invention relates to 1,3-dithiolanes. The dithiolanes of the present invention have the following general structural formula:

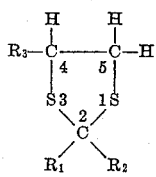

If, in the above formula, all of the R's are hydrogen, the compound is 1,3-dithiolane. The preferred compounds of the present invention have organic radicals substituted for at least $R_1$ of the formula, as is later disclosed in greater detail. In the above formula, $R_1$ or $R_2$ or both may be hydrogen, aliphatic radicals of from 1 to 18 carbon atoms, either saturated or unsaturated, aromatic radicals, aralkyl radicals, heterocyclic radicals, or alkaryl radicals. The organic radicals may have substituents thereon such as halogen atoms, alkoxy radicals or hydroxy radicals. Typical substituents for $R_1$ and/or $R_2$ are methyl, ethyl, propyl, tolyl, propenyl, trichloromethyl, decenyl, octadecenyl, furyl, indanyl, phenyl, parachlorophenyl, 2,4-dichlorophenyl, p-hydroxyphenyl, p-methoxyphenyl, benzyl, styryl and pentamethylene radicals. Of these various substituents, aromatic radicals and particularly halogenated aromatic radicals are preferred. $R_3$ may be hydrogen or a lower alkyl radical.

Typical compounds falling within the scope of the present invention include the following. In each case code numbers have been assigned to the compounds, and these code numbers are used subsequently in the application in place of the names of the substances themselves.

N–528  1,3-dithiolane
N–645  2-methyl-1,3-dithiolane
N–571  2-ethyl-1,3-dithiolane
N–570  2-n-propyl-1,3-dithiolane
N–552  2-propenyl-1,3-dithiolane
N–647  2-n-hexyl-1,3-dithiolane
N–533  2-octadecenyl-1,3-dithiolane
N–428  2,2-dimethyl-1,3-dithiolane
N–427  2-trichloromethyl-1,3-dithiolane
N–430  2-phenyl-1,3-dithiolane
N–634  2-o-chlorophenyl-1,3-dithiolane
N–551  2-p-chlorophenyl-1,3-dithiolane
N–624  2-(2,4-dichlorophenyl)-1,3-dithiolane
N–633  2-(p-hydroxyphenyl)-1,3-dithiolane
N–635  2-(p-methoxyphenyl)-1,3-dithiolane
N–671  2-benzyl-1,3-dithiolane
N–672  2-styryl-1,3-dithiolane
N–658  2,2-diphenyl-1,3-dithiolane
N–681  2-phenyl-2-p-chlorophenyl - 1,3 - dithiolane
N–637  2-methyl-2-p-chlorophenyl - 1,3 - dithiolane
N–679  2-ethyl-2-p-chlorophenyl-1,3 - dithiolane
N–638  2-p-chlorophenyl-4-methyl - 1,3 - dithiolane
N–625  2-p-chlorophenyl - 4 - hydroxymethyl-1,3-dithiolane
N–680  2-cyclohexenyl-1,3-dithiolane
N–654  2,2-pentamethylene-1,3-dithiolane
N–532  2-(2-furfuryl)-1,3-dithiolane
N–664  2-(1',3'-dithiolyl)-1,3-dithiolane
N–640  2 - (3',4'-dioxymethylenephenyl) - 1,3-dithiolane
N–700  2-p-tolyl-1,3-dithiolane
N–682  2-indanyl-1,3-dithiolane The compounds of the present invention may be readily manufactured in a number of ways. One reaction which we have found particularly suitable is the reaction of ethylene dimercaptan with an aldehyde or ketone, the aldehyde of ketone being selected to correspond with the desired substituents on $R_1$ and/or $R_2$. Thus, in the manufacture of Compound N–551, we may employ the following reaction:

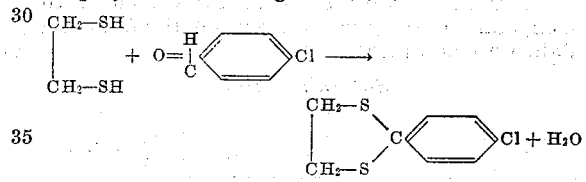

This reaction runs smoothly in benzene with a trace of p-toluene sulfonic acid as a catalyst. The water produced by the reaction is removed by azeotropic distillation as it is formed. Another alternative reaction for producing the compounds of the present invention is the reaction between an ethylene mercaptide, such as disodium mercaptide, with a halogenated organic compound corresponding to the desired substituent on $R_1$ and $R_2$. Thus, N–551 may also be produced by the following:

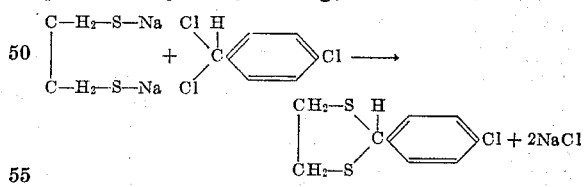

Instead of using ethylene dimercaptan or the mercaptide, we may use other mercaptans or mercaptides depending upon the substituent desired in the R3 position.

The compounds of the present invention have been extensively tested as insecticides. In carrying out these tests, the following techniques were used.

INSECT SCREENING TEST

Acetone solutions of the compounds are dispersed in water that has 0.015% Vatsol OT wetting agent and 0.005% Methocel (25 cps.) dissolved in it. The amount of water in the dispersion is adjusted so that the compound under test has a concentration of 0.5%. The dispersion is sprayed on the insects with a De Vilbiss hand sprayer. The insects are held in the sprayed cages for 72 hours. Mortality counts are made at 72 hours and the results reported as percentage of insects killed.

RESIDUE TEST

Compounds are deposited on 60 x 15 mm. Petri dishes from acetone solutions. Adult female flies are exposed to the deposits in open and closed type cages for 48 hours. Mortality counts are made at 48 hours.

AEROSOL SPRAY

One ml. of a 2% solution of the compound dissolved in Base Oil C is sprayed onto insects in an aerosol chamber through a De Vilbiss artist's air-brush gun. Mortality counts are made in 24 hours.

TOPICAL APPLICATION

Flies are treated with individual 2.00±0.05 cubic millimeter drops of the compound in acetone solution. The application is accomplished by means of a No. 27 gauge hypodermic needle bent downward 90° from the horizontal, ground flat at the tip and attached to a 1.00 ml. tuberculin syringe. The syringe is mounted so that the plunger is driven forward by a hand-driven micrometer caliper a distance of 0.005 inch. The flies are anesthetized with carbon dioxide during the application. After treatment, the insects are transferred to cardboard cages for recovery. Mortality counts are made in 48 hours.

When the above tests were carried out with compounds of the present invention, the following data were obtained:

Screening tests

| Compound No. | M. domestica | P. americana | O. fasciatus | T. confusum | A. fabae |
|---|---|---|---|---|---|
| N-528 | 4 | | | 7 | |
| N-645 | 20 | | 10 | | |
| N-571 | 32 | 40 | 20 | | 25 |
| N-570 | 60 | 10 | 10 | | 25 |
| N-552 | 24 | 10 | 10 | | |
| N-647 | 24 | | 20 | | |
| N-533 | 4 | 10 | | 35 | |
| N-428 | 15 | | | | |
| N-427 | 100 | 90 | 20 | 84 | 100 |
| N-430 | 100 | 70 | 40 | 21 | 100 |
| N-634 | 76 | 10 | 10 | | 25 |
| N-551 | 100 | 90 | 10 | 100 | 75 |
| N-624 | 100 | 40 | 30 | 28 | 50 |
| N-633 | | | 20 | 10 | |
| N-635 | 12 | | | 10 | 50 |
| N-671 | 68 | 30 | 50 | 47 | |
| N-672 | 36 | | 50 | | |
| N-681 | 88 | 20 | 40 | 33 | |
| N-637 | 100 | 80 | 50 | 100 | 75 |
| N-679 | 100 | 60 | 30 | 14 | 50 |
| N-638 | 100 | 80 | 10 | 100 | 100 |
| N-625 | 60 | | 30 | 14 | 25 |
| N-680 | 72 | 30 | 70 | 100 | |
| N-654 | 24 | 10 | | 7 | |
| N-532 | 28 | | 10 | 100 | |
| N-664 | 12 | | 10 | 7 | 50 |
| N-640 | 60 | | | | 50 |
| N-682 | 100 | 50 | | 7 | |

Topical tests

| | Micrograms per fly | | | | | | |
|---|---|---|---|---|---|---|---|
| | 20 | 10 | 4 | 3 | 2 | 1.5 | 1 |
| N-430 | 76 | | | | 12 | | |
| N-624 | 20 | 12 | | | | | |
| N-551 | | | 100 | 94 | 64 | 30 | 12 |
| N-637 | | | 98 | 76 | 42 | 20 | 12 |
| N-638 | | | 100 | 100 | 98 | 82 | 30 |
| N-679 | 100 | 68 | | | 16 | | |

Aerosol

| | 24 hour mortality—1 ml. 2% solution in oil |
|---|---|
| N-551 | 50 |
| N-637 | 14 |
| N-638 | 86 |

Residue

| | Micrograms per cage | | | | | |
|---|---|---|---|---|---|---|
| | 10,000 | 1,000 | 750 | 500 | 250 | 100 |
| N-551 | | 96 | 64 | 48 | 24 | |
| N-637 | | 100 | 100 | 100 | 64 | |
| N-638 | | 100 | 100 | 100 | 84 | 24 |
| N-624 | 100 | 96 | | | | |
| N-430 | 100 | | | | | |
| N-427 | 100 | | | | | |
| N-679 | 100 | 88 | | 24 | | 4 |

The compounds of the present invention may be employed as insecticides in a number of ways. They may be dissolved in a solvent, such as acetone, and the solution used as a spray. Suitable solvents include acetone and ethanol. Ordinarily the compound, such as 2-p-chlorophenyl-1,3-dithiolane is dissolved in the solvent in a concentration of from about 0.2% to .05%.

They may be emulsified in water with the aid of well-known emulsifying agents, and the emulsion thus prepared used as a spray. To emulsify the compounds it is ordinarily desirable to first dissolve the compound in a water immiscible solvent and then disperse the solution. Thus, a 25% solution of 2-p-chlorophenyl-1,3-dithiolane in xylene may be prepared and about 5% of a sulfated fatty alcohol wetting agent added thereto. The solution thus prepared may be readily dispersed in water. They may be adsorbed on finely divided inert solid carriers such as clay, and used as a dust. To prepare a dust, the compound may be ground with finely divided clay, such as Attaclay.

The compound may be used as wettable powders. For such use about 50% of the compound, such as 2-p-chlorophenyl-1,3-dithiolane is ground with 50% clay and a small amount of wetting agent added. The powder may be made into a water dispersion suitable for spray application by the addition of water.

The compounds may be dissolved in aerosol solutions and used in this form. Further, the compounds of the present invention have substantial residual action so that they may be incorporated in paints or varnish-like materials and applied to surfaces for long-lasting insecticidal protection.

We claim:

1. As an insecticide, an inert insecticidal adjuvant and 2-trichloromethyl-1,3-dithiolane.

2. As an insecticide, an inert insecticidal adjuvant and 2-p-chlorophenyl-1,3-dithiolane.

3. As an insecticide, an inert insecticidal adjuvant and 2-(2,4-dichlorophenyl)-1,3-dithiolane.

4. As an insecticide, an inert insecticidal adjuvant and 2-methyl-2-p-chlorophenyl-1,3-dithiolane.

5. As an insecticide, an inert insecticidal adjuvant and 2-p-chlorophenyl-4-methyl-1,3-dithiolane.

6. An insecticidal composition of matter comprising an inert insecticidal adjuvant as a carrier and a compound having the formula:

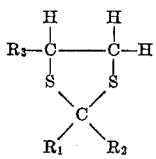

wherein $R_1$ and $R_2$ are selected from the group consisting of hydrogen atoms, aliphatic radicals of from 1 to 18 carbon atoms, aryl radicals, the furyl radical, the furfuryl radical, alkaryl radicals and aralkyl radicals and $R_3$ is selected from the group consisting of hydrogen and lower alkyl radicals.

7. The method of killing insects comprising applying to an insect habitat a compound having the formula:

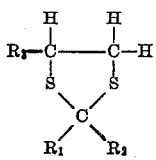

wherein $R_1$ and $R_2$ are selected from the group consisting of hydrogen atoms, aliphatic radicals of from 1 to 18 carbon atoms, aryl radicals, the furyl radical, the furfuryl radical, alkaryl radicals and aralkyl radicals and $R_3$ is selected from the group consisting of hydrogen and lower alkyl radicals.

8. The method of killing insects comprising applying to an insect habitat 2-trichloromethyl-1,3-dithiolane.

9. The method of killing insects comprising applying to an insect habitat 2-p-chlorophenyl-1,3-dithiolane.

10. The method of killing insects comprising applying to an insect habitat 2-(2,4-dichlorophenyl)-1,3-dithiolane.

11. The method of killing insects comprising applying to an insect habitat 2-methyl-2-p-chlorophenyl-1,3-dithiolane.

12. The method of killing insects comprising applying to an insect habitat 2-p-chlorophenyl-4-methyl-1,3-dithiolane.

References Cited in the file of this patent

UNITED STATES PATENTS

| Number | Name | Date |
|---|---|---|
| 2,647,129 | Bashour | July 28, 1953 |